(12) United States Patent
Eyerman et al.

(10) Patent No.: US 11,951,792 B2
(45) Date of Patent: Apr. 9, 2024

(54) SUSPENSION COMPONENT DAMAGE DETECTION WITH MARKER

(71) Applicant: Ford Global Technologies, LLC, Dearborn, MI (US)

(72) Inventors: Devon Eyerman, Plymouth, MI (US); Jonathan Barker, Ann Arbor, MI (US); Dexin Wang, Livonia, MI (US); Austin James Jeffries, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 778 days.

(21) Appl. No.: 16/798,795

(22) Filed: Feb. 24, 2020

(65) Prior Publication Data

US 2021/0260950 A1    Aug. 26, 2021

(51) Int. Cl.
*B60G 17/019* (2006.01)
*B60G 17/0185* (2006.01)
(Continued)

(52) U.S. Cl.
CPC ....... *B60G 17/0185* (2013.01); *B60G 17/019* (2013.01); *G01P 3/38* (2013.01);
(Continued)

(58) Field of Classification Search
CPC .... G07C 5/0841; G07C 5/085; G07C 5/0875; B62D 6/008; B62D 15/02; B60G 17/015; B60G 17/019
(Continued)

(56) References Cited

U.S. PATENT DOCUMENTS

| | | | | |
|---|---|---|---|---|
| 4,838,574 A | * | 6/1989 | Baraszu | B60G 17/0165 280/5.515 |
| 5,062,657 A | * | 11/1991 | Majeed | F16F 9/46 280/5.503 |

(Continued)

FOREIGN PATENT DOCUMENTS

| | | | | |
|---|---|---|---|---|
| CA | 2295166 A1 | * | 12/1998 | B60G 11/02 |
| CN | 110231181 A | * | 9/2019 | G01M 17/007 |

(Continued)

OTHER PUBLICATIONS

J. Ma, S. Susca, M. Bajracharya, L. Matthies, M. Malchano and D. Wooden, "Robust multi-sensor, day/night 6-DOF pose estimation for a dynamic legged vehicle in GPS-denied environments," 2012 IEEE International Conference on Robotics and Automation, 2012, pp. 619-626, doi: 10.1109/ICRA.2012.6225132. (Year: 2012).*

(Continued)

*Primary Examiner* — Cuong H Nguyen
(74) *Attorney, Agent, or Firm* — Frank A. MacKenzie; Bejin Bieneman PLC

(57) ABSTRACT

A detected displacement of a marker on a vehicle is determined based on image data captured while the vehicle traverses a displacement object of a ground surface. Then a health status of a suspension component of the vehicle is determined to be unhealthy based on comparing the detected displacement of the marker to a target displacement of the marker. The target displacement specifies displacement of the marker that indicates the suspension component is healthy. The vehicle is operated based on the suspension component being unhealthy.

20 Claims, 6 Drawing Sheets

(51) Int. Cl.
  *G01P 3/38* (2006.01)
  *G05B 13/02* (2006.01)
  *G07C 5/08* (2006.01)
  *G06N 3/04* (2023.01)

(52) U.S. Cl.
  CPC ......... *G05B 13/027* (2013.01); *G07C 5/0808* (2013.01); *G06N 3/04* (2013.01)

(58) Field of Classification Search
  USPC .................. 701/37; 280/5.515, 5.516, 5.517
  See application file for complete search history.

(56) References Cited

U.S. PATENT DOCUMENTS

| | | | |
|---|---|---|---|
| 5,999,868 A * | 12/1999 | Beno | B60G 17/0165 |
| | | | 280/5.514 |
| 6,418,360 B1 | 7/2002 | Spivey et al. | |
| 6,738,697 B2 | 5/2004 | Breed | |
| 7,103,460 B1 | 9/2006 | Breed | |
| 8,185,269 B2 | 5/2012 | Li et al. | |
| 9,406,177 B2 | 8/2016 | Attard et al. | |
| 9,702,349 B2 * | 7/2017 | Anderson | B60G 17/052 |
| 10,759,247 B2 * | 9/2020 | Galasso | B62J 45/41 |
| 2004/0078125 A1 * | 4/2004 | Woodard | G07C 5/008 |
| | | | 701/29.3 |
| 2010/0211249 A1 * | 8/2010 | Mcclellan | G07C 5/006 |
| | | | 701/31.4 |
| 2019/0030975 A1 * | 1/2019 | Galasso | B60G 17/0424 |
| 2019/0066398 A1 | 2/2019 | Sankavaram et al. | |

FOREIGN PATENT DOCUMENTS

| | | | | |
|---|---|---|---|---|
| CN | 110231181 B | * | 12/2020 | .......... G01M 17/007 |
| DE | 3826196 A1 | * | 2/1990 | ............ G01M 17/04 |
| EP | 3308353 B1 | | 4/2019 | |
| EP | 3567272 B1 | * | 5/2021 | .......... B60G 17/015 |
| JP | 2013147113 A | * | 8/2013 | .......... B60G 17/015 |
| JP | 2013148429 A | * | 8/2013 | .......... G01M 17/045 |
| JP | 2013149036 A | * | 8/2013 | |
| JP | 2020131822 A | * | 8/2020 | ............. B60G 11/27 |
| JP | 7190109 B2 | * | 12/2022 | ............. B60G 11/27 |
| WO | WO-2014180589 A1 | * | 11/2014 | ................ B60S 9/12 |

OTHER PUBLICATIONS

J. Yang, E. Hou and M. Zhou, "Front Sensor and GPS-Based Lateral Control of Automated Vehicles," in IEEE Transactions on Intelligent Transportation Systems, vol. 14, No. 1, pp. 146-154, Mar. 2013, doi: 10.1109/TITS.2012.2207894. (Year: 2013).*

Flores-Fuentes, Wendy, et al. "A structural health monitoring method proposal based on optical scanning and computational models." International Journal of Distributed Sensor Networks 18.8 (2022): 15501329221112606 (Year: 2022).*

Kuwahara, Hiroaki, and Toshiyuki Murakami. "Position control considering slip motion of tracked vehicle using driving force distribution and lateral disturbance suppression." IEEE Access 10 (2022): 20571-20580 (Year: 2022).*

Wang, Miaomin, et al. "Completely non-contact modal testing of full-scale bridge in challenging conditions using vision sensing systems." Engineering Structures 272 (2022): 114994 (Year: 2022).*

Dai, Liangcheng, et al. "An investigation into the modeling methodology of the coil spring." Shock and Vibration 2020 (Year: 2020).*

* cited by examiner

SUSPENSION COMPONENT DAMAGE DETECTION WITH MARKER

BACKGROUND

Suspension component damage (for example caused by a vehicle traveling along a roadway and a vehicle wheel being impacted by a road condition such as a pothole, bump, etc.) can impair vehicle operation and/or damage a vehicle. Suspension component damage may not be detected in short order due to one or more attributes of the suspension component not being monitored, e.g., by sensors, during vehicle operation, which may exacerbate vehicle impairment and/or damage, and/or make identification of contributing road conditions difficult.

DETAILED DESCRIPTION

Figure 1:
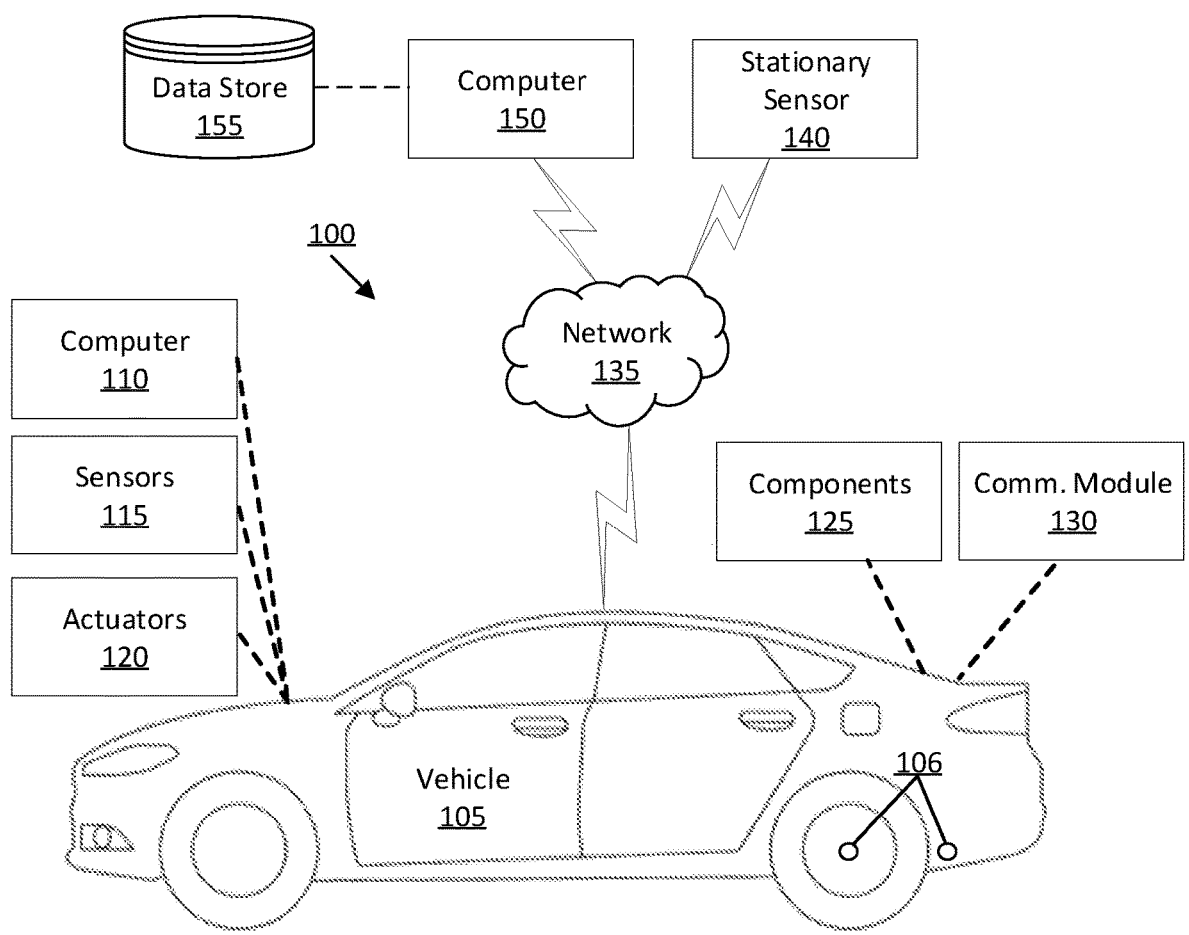
FIG. 1 is a block diagram illustrating an example system for determining a health status of a suspension component of a vehicle.

A system includes a computer including a processor and a memory, the memory storing instructions executable by the processor to determine a detected displacement of a marker on a vehicle based on image data captured while the vehicle traverses a vertical displacement of a ground surface. The instructions further include instructions to then determine a health status of a suspension component of the vehicle is unhealthy based on comparing the detected displacement of the marker to a target displacement of the marker. The target displacement specifies displacement of the marker indicating the suspension component is healthy. The instructions further include instructions to operate the vehicle based on the suspension component being unhealthy.

The instructions can further include instructions to determine the suspension component is unhealthy based on a damping characteristic of the detected displacement of the marker being equal to or greater than a first threshold from a damping characteristic of the target displacement. The damping characteristic may be one of an amplitude, a frequency, or a damping ratio.

The instructions can further include instructions to request authorization to operate the vehicle based on the damping characteristic of the detected displacement of the marker being between a second threshold from the damping characteristic of the target displacement and the first threshold. The second threshold may be less than the first threshold.

The instructions can further include instructions to, upon receiving authorization from a vehicle computer, transmit a message to the vehicle computer actuating one or more vehicle components to operate the vehicle to a predetermined location.

The instructions can further include instructions to determine the target displacement based on at least one of a speed of the vehicle, a marker identifier, the vertical displacement, and a suspension operation mode. The suspension operation mode may specify operating parameters of one or more suspension components of the vehicle The instructions can further include instructions to determine the speed of the vehicle based on the image data.

The instructions can further include instructions to detect the marker identifier in the image data.

The instructions can further include instructions to receive a message from a vehicle computer specifying the suspension operation mode.

The instructions can further include instructions to determine the vertical displacement based on the image data.

The instructions can further include instructions to transmit a message to a vehicle computer actuating one or more vehicle components to operate the vehicle at a specified speed over the vertical displacement.

The instructions can further include instructions to, upon determining the suspension component is unhealthy, transmit a message to a vehicle computer actuating one or more vehicle components to operate the vehicle to a predetermined location.

The instructions can further include instructions to identify the marker based on comparing marker indicia in the image to marker indicia in stored marker images.

The suspension component may be one of a damper, a spring, or a bushing

The instructions can further include instructions to update the target displacement based on the detected displacement of the marker and the target displacement being input into a neural network, wherein the neural network outputs an updated target displacement.

The instructions can further include instructions to determine a detected height of the marker based on the image data. The instructions can further include instructions to then determine the health status of a suspension component of the vehicle is unhealthy based further on comparing the detected height of the marker to a target height of the marker. The target height may specify a height of the marker indicating the suspension component is healthy.

A method includes determining a detected displacement of a marker on a vehicle based on image data captured while the vehicle traverses a vertical displacement of a ground surface. The method further includes then determining a health status of a suspension component of the vehicle is unhealthy based on comparing the detected displacement of the marker to a target displacement of the marker. The target displacement specifies displacement of the marker indicating the suspension component is healthy. The method further includes operating the vehicle based on the suspension component being unhealthy.

The method can further include determining the suspension component is unhealthy based on a damping characteristic of the detected displacement of the marker being equal to or greater than a first threshold from a damping characteristic of the target displacement.

The method can further include requesting authorization to operate the vehicle based on the damping characteristic of the detected displacement of the marker being between a second threshold from the damping characteristic of the target displacement and the first threshold. The second threshold may be less than the first threshold.

The method can further include determining the target displacement based on at least one of a speed of the vehicle, a marker identifier, the vertical displacement, and a suspension operation mode. The suspension operation mode may specify operating parameters of one or more suspension components of the vehicle.

The suspension component may be one of a damper, a spring, or a bushing

Further disclosed herein is a computing device programmed to execute any of the above method steps. Yet further disclosed herein is a computer program product, including a computer readable medium storing instructions executable by a computer processor, to execute an of the above method steps.

Figure 3A:
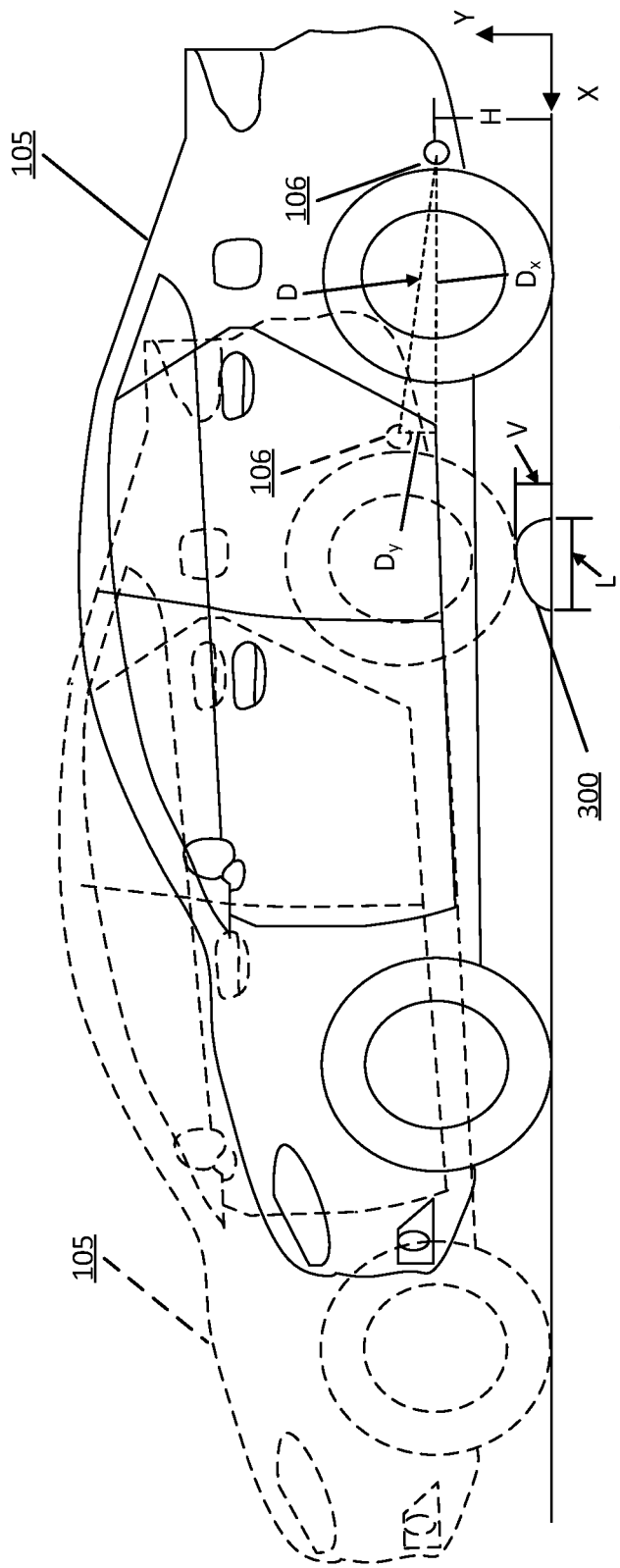
FIGS. 3A-3B are diagrams illustrating displacement of a marker while the vehicle traverses an example vertical displacement on a ground surface.
Figure 3B:
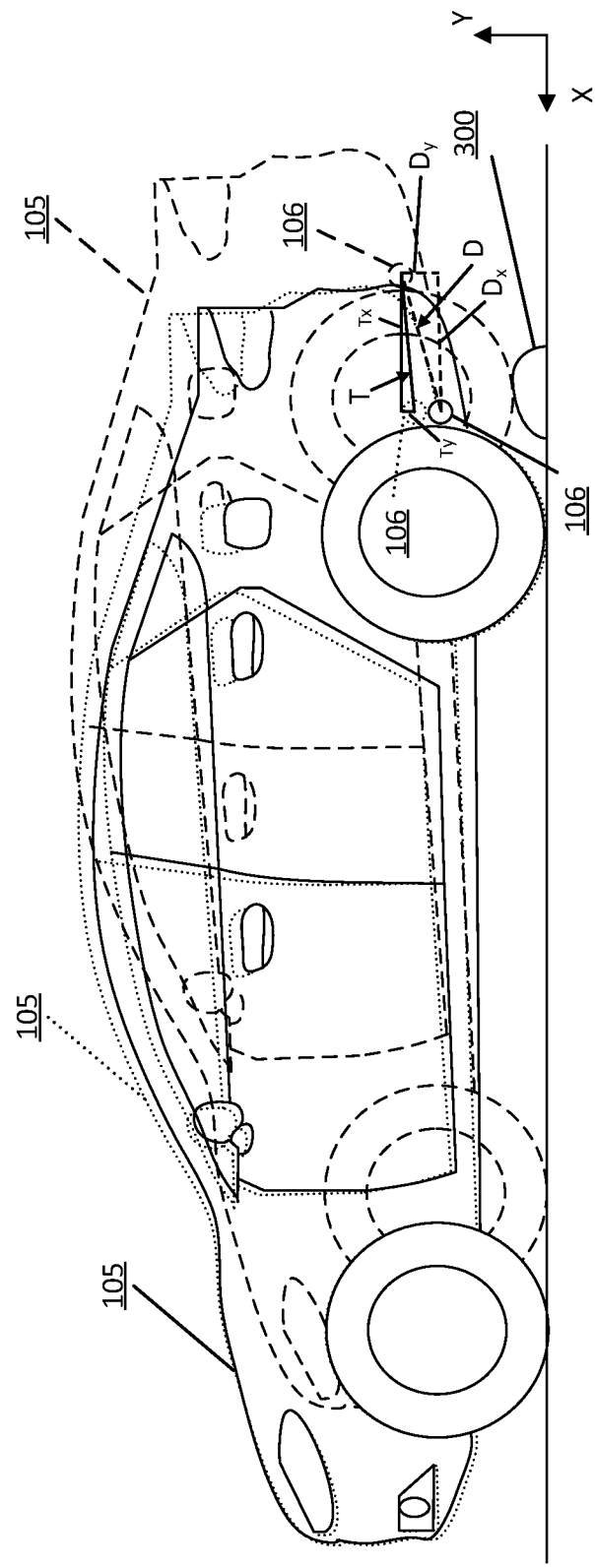

FIG. 1 illustrates an exemplary system 100 for determining a health status of a suspension component 125 of a vehicle 105. A remote computer 150 is programmed to receive data from the vehicle 105 via a wide area network 135, and to determine a detected displacement D of a marker 106 on the vehicle 105 based on image data captured while the vehicle 105 traverses a displacement object 300 on and/or in a ground surface. As used herein, "traverses a displacement object" means traversing the ground surface from one point to another point on the ground surface with a displacement object 300 between those two points on the ground surface. The displacement object 300 has a vertical displacement V, i.e., a height, and a horizontal displacement L, i.e., a length, each determined relative to the ground surface, e.g., based on a Cartesian XY coordinate system having an origin on the ground surface, as shown in FIG. 3A. The vertical and horizontal displacements V, L are physical components, i.e., dimensions, of the displacement object 300. For example, the displacement object 300 may be a protrusion on the ground surface (as shown in FIGS. 3A-3B), i.e., have a vertical displacement V extending upwardly from the ground surface. Alternatively, the displacement object 300 may be a depression in the ground surface, i.e., have a vertical displacement V extending downwardly from the ground surface. That is, the vertical displacement of the displacement object 300 is an anomaly relative to the ground surface. The displacement object 300 can be, e.g., a speed bump, a pothole, rumble strips, debris, or any other type of protrusion on or depression in the ground surface.

The detected displacement D (see FIGS. 3A-3B) is the detected linear displacement of the marker 106 while the vehicle 105 traverses the displacement object 300. The detected displacement D indicates a linear displacement, e.g., in the Cartesian XY coordinate system, of the marker 106 relative to the ground surface and/or the displacement object 300 at one point in time with reference to a previous point in time, e.g., determined via frames of sequential image data, while the vehicle 105 traverses the displacement object 300. The linear displacement of the marker 106 varies from the displacement object 300, i.e., the vertical and/or horizontal displacements V, L, due to movement, e.g., compression and/or extension, of the suspension component 125 while the vehicle 105 traverses the displacement object 300. The detected displacement D has a vertical component $D_y$ and/or a horizontal component $D_x$ of the linear displacement of the marker 106, e.g., based on the Cartesian XY coordinate system having the origin on the ground surface, as shown in FIGS. 3A-3B.

The computer 150 is further programmed to then determine a health status of a suspension component 125 of the vehicle based on comparing the detected displacement D of the marker 106 to a target displacement T (see FIG. 3B) of the marker 106. A target displacement T specifies a threshold displacement of the marker 106 indicating the suspension component 125 is healthy based on the detected displacement D being less than a first threshold T1 of the target displacement T; a displacement outside of the first threshold T1 of the target displacement T means that the suspension component 125 is determined to be unhealthy, as described further below. One example of a target displacement T of the marker 106 indicating the suspension component 125 is healthy is shown in FIG. 3B. The target displacement T is the expected linear displacement of the marker 106 at one point in time with reference to a previous point in time, e.g., determined via frames of sequential image data, while the vehicle 105 traverses the displacement object 300 when the suspension component 125 is healthy. The target displacement T has a vertical component $T_y$ and/or a horizontal component $T_x$, e.g., based on a Cartesian XY coordinate system having an origin on the ground surface, as shown in FIG. 3B. The computer 150 is further programmed to operate the vehicle 105 based on the suspension component 125 being unhealthy.

The vehicle 105, e.g., via a vehicle computer 110, is programmed to determine that one or more vehicle components 125, including a suspension component 125, is unhealthy based on the vehicle computer 110 identifying a fault code, e.g., a diagnostic trouble code (DTC) or the like. For example, the vehicle computer 110 can receive data, e.g., from one or more sensors 115 monitoring the respective vehicle component 125, describing operation of the vehicle component 125. In the case that one or more attributes of the vehicle component 125 operation is or are not monitored by sensors 115, the vehicle computer 110 may not identify a fault code. That is, the vehicle component 125 may be unhealthy, but the vehicle computer 110 may not determine the vehicle component 125 is unhealthy because a fault code was not identified. Advantageously, the computer 150 can determine a vehicle component 125 is unhealthy and operate the vehicle 105, e.g., to obtain needed maintenance and/or repair of the unhealthy vehicle component 125, even when a fault code is not identified by the vehicle computer 110.

The vehicle 105 includes a vehicle computer 110, sensors 115, actuators 120 to actuate various vehicle components 125, and a vehicle communications module 130. The communications module 130 allows the vehicle computer 110 to communicate with one or more stationary sensors 140 and the computer 150, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle computer 110 may be programmed to actuate one or more suspension components 125 based on a suspension operation mode. The suspension operation mode specifies suspension operating parameters, i.e., a measurable set of physical parameters, for one or more suspension components 125. Non-limiting suspension operation modes include "Sport mode," "Track mode," "Eco mode," "Comfort mode," "Aero mode," "Off Road mode," "Park mode," etc. The vehicle computer 110 can, for example, receive a user input, e.g., via a human-machine interface such as a touchscreen, a button, a lever, a rotating dial, etc., specifying a suspension operation mode. That is, a user of the vehicle 105 may be able to select the suspension operation mode, e.g., to adjust the ride comfort of the vehicle 105. The vehicle computer 110 may then actuate one or more suspension components 125 to suspension operating parameters, e.g., a camber angle, a stiffness, a ride height, etc., associated with the selected suspension operation mode. The vehicle computer 110 can then transmit a message to the computer 150 specifying the suspension operation mode, e.g., via the network 135.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, to a stationary sensor 140 (typically via direct radio frequency communications), and/or (typically via the network 135) to the computer 150. The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the stationary sensor 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The computer 150 includes a processor and a memory such as are known. The memory includes one or more forms of computer-readable media, and stores instructions executable by the computer 150 for performing various operations, including as disclosed herein. Further, the computer 150 can be accessed via the network 135, e.g., the Internet or some other wide area network. A data store 155 may be a memory of the computer 150 and/or a conventional data store, e.g., hard disk drives, solid state drives, servers, or any volatile or non-volatile media, communicatively coupled to the computer 150, including possibly via a network 135.

The data store 155 typically includes a plurality of data records. Each data record can be substantially uniquely identified by an identifier. A marker 106 can be decoded to provide the identifier, i.e., decoding the marker 106 can provide an identifier to locate a record in the data store 155. Each data record identified by a marker 106 identifier includes data about a vehicle 105, typically including a description of vehicle 105 dimensions and/or weight (e.g., a weight distribution along the vehicle 105). In the present context, vehicle 105 dimensions are a three-dimensional description of the vehicle 105, i.e., data from which a space that the vehicle 105 will occupy in a physical environment can be predicted. In the present context, a dimension is a measurable extent along a line, e.g., a length, a width, and/or a height. A record for a marker 106 typically also includes data specifying a marker 106 position on the vehicle 105, e.g., on a wheel, a rear fascia, an exterior body panel, etc.

Figure 4:
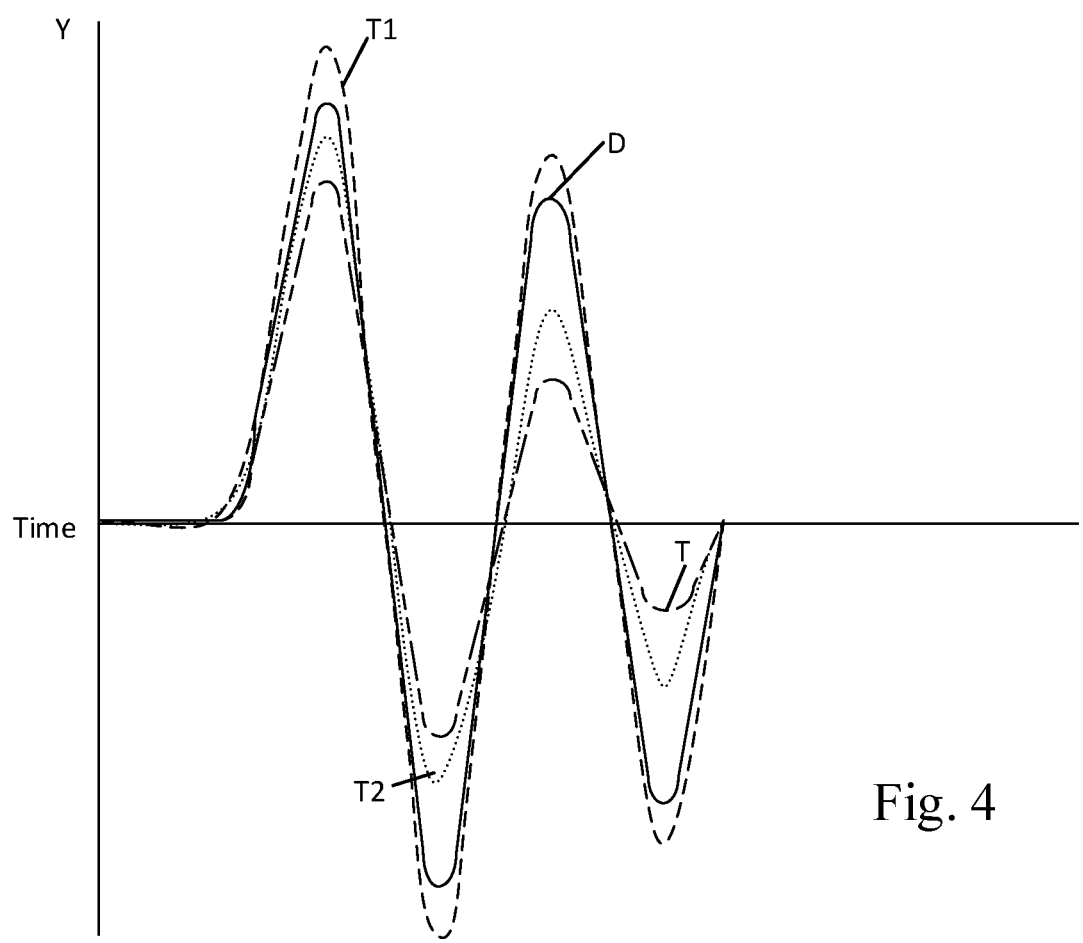
FIG. 4 is an example plot comparing the detected displacement to the target displacement.

A data record identified by a marker 106 can additionally include target displacements T of the marker 106. The target displacement T indicates the suspension component 125 is healthy. The target displacement T may be stored, e.g., in the data record, as a plot, as shown in FIG. 4, of the displacement of the marker 106 for a duration of time (e.g., while the vehicle 105 traverses the displacement object 300). The computer 150 can, using various conventional processing techniques, determine one or more target damping characteristics, e.g., an amplitude, a frequency, a damping ratio, etc., of the suspension component 125 based on the plot of the target displacement T. As used herein, a "damping characteristic" is a physical measurement of damping, e.g., as produced by the suspension component 125 while the vehicle 105 traverses the displacement object 300. Oscillations of the target displacement T while the vehicle 105 traverses the displacement object indicate the target damping characteristics of the suspension component 125. That is, the computer 150 determines the target damping characteristics of the suspension component 125 based on the target displacement T of the marker 106. The target displacement T can be updated based on the detected displacement D, as described further below.

The target displacement T, as shown in FIG. 4, can be recorded, for example, under specified operating parameters of the vehicle 105. A vehicle 105 operating parameter herein means a measurable physical parameter, i.e., a measurement of a physical phenomenon, for a vehicle 105 and/or the vehicle 105 environment. A variety of operating parameters may be determined for a vehicle 105 traversing a displacement object 300 on a ground surface. A non-limiting list of operating parameters includes a speed of the vehicle 105, the vertical displacement V of the displacement object 300, a marker 106 identifier, a weight distribution of the vehicle 105 (e.g., including a weight and a position of cargo and/or occupants of the vehicle 105), a ride height and/or a stiffness of one or more suspension components 125 (e.g., associated with the selected suspension operation mode), etc. The data record can include a list of each target displacement T of the marker 106 associated with different operating parameters.

Additionally, or alternatively, a data record identified by a marker 106 can include a target height of the marker 106 when the suspension component 125 is healthy. A target height of the marker 106 is a threshold vertical distance indicating the suspension component 125 is healthy based on the height being within a range, e.g., +\−10%, of the target height H. A target height H is determined from a reference point to the marker 106. The reference point may, for example, be the ground surface, a wheel center, a point on the body of the vehicle 105, etc. The target height can be determined based on analysis of image data including a vehicle 105 having a suspension component 125 that is healthy.

A stationary sensor 140 can be deployed in a fixed or stationary manner, e.g., mounted to a pole, positioned on a non-moving truck, mounted to a building, etc. The stationary sensor 140 may include a sensor such as described above for the vehicle 105 sensors 115, e.g., LIDAR, radar, cameras, ultrasonic sensors, etc. The field of view of the stationary sensor 140 is substantially unmoving and unchanging. The field of view of the stationary sensor 140 includes the displacement object 300 of the ground surface. That is, the stationary sensor 140 is positioned to detect a marker 106 while a vehicle 105 traverses the displacement object 300.

Stationary sensors 140 thus provide field of views in contrast to vehicle 105 sensors 115 in a number of advantageous respects. First, because stationary sensors 140 have a substantially constant field of view, determinations of vehicle 105 and object locations, e.g., including a displacement object 300, can be accomplished with fewer and simpler processing resources than if movement of a sensor or sensors 115 also had to be accounted for. Further, the stationary sensors 140 include an external perspective of the vehicle 105 and can sometimes detect features and characteristics of objects, e.g., the displacement object 300, not in the vehicle 105 sensors 115 field(s) of view and/or can provide more accurate detection, e.g., with respect to vehicle 105 location and/or movement with respect to other objects, e.g., the displacement object 300. Yet further, stationary sensors 140 can communicate with the computer 150 via a wired connection, whereas vehicles 105 typically can communicate with the computer 150 only wirelessly, or only at limited times when a wired connection is available. Wired communications are typically more reliable and can be faster than wireless communications such as vehicle-to-infrastructure communications or the like.

The stationary sensor 140 can provide digital images, e.g., as frames of video in a compressed format such as MPEG or the like. MPEG refers to a set of standards generally promulgated by the International Standards Organization/International Electrical Commission Moving Picture Experts Group (MPEG). Each frame in video data from the stationary sensor 140 can be a specified number of pixels wide by a specified number of pixels tall. A marker 106 can be identified in a frame, including location(s) of pixels in the image used to depict the marker 106, according to various image or pattern recognition techniques.

Figure 2A:
FIGS. 2A-2B are illustrations of example markers.
Figure 2B:
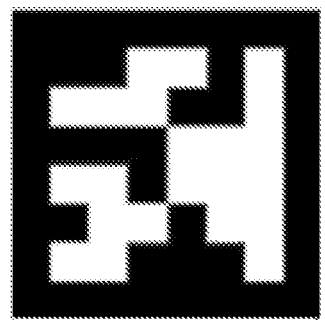

The marker 106 can be any visual pattern, e.g., a pattern of letters and/or numbers (e.g., a vehicle identification number), a barcode, or other shapes, lines, or markers (e.g., as could be provided in a corporate logo or the like). The marker 106 may, for example, identify the vehicle 105. The marker 106 can be referred to as a fiducial marker 106. A fiducial marker 106 is an object placed in the field of view of an imaging system which appears in the image produced, for use as a point of reference or a measurement. For example, as shown in FIG. 2A, the fiducial marker 106 can be what is known as a Quick Response (QR) code; as is known, a QR code may be used to encode an identifier that may be decoded upon acquiring an image of the QR code. As another example, as shown in FIG. 2B, a fiducial marker 106 can include a number of ArUco fiducial marks. ArUco fiducial marks are two-dimensional (2D) patterns from a library of fiducial marks described at www.uco.es/grupos/ava/node/26, "Aplicaciones de la Vision Artificial", University of Cordoba, Spain, May 15, 2019. ArUco fiducial marks are designed to be read by machine vision software that can determine a pose with respect to the coordinate system for each ArUco fiducial mark included in a fiducial marker 106 by processing a 2D (two-dimensional) image of the fiducial marker 106. The ArUco marker has a simpler pattern than the QR code and, therefore, typically requires less processing and/or less processing time to decode and/or analyze. The marker 106 may alternatively or additionally include a physical object affixed to the vehicle 105, e.g., via adhesive, fasteners, etc. Alternatively, or additionally, the marker 106 could include a feature or features, e.g., size, shape, contour, etc., of a vehicle 105 body. In such an example, the marker 106 may be one or more lines and/or edges of an exterior body panel of the vehicle 105.

Each fiducial marker 106 should be substantially unique at least with respect to a class of vehicles 105 and a position of the marker 106 on each vehicle 105. In the present context, a class of vehicles 105 means one or more vehicles 105 having substantially identical dimensions, e.g., vehicles 105 of the same make and model. Thus, in some implementations, one fiducial marker 106 can be affixed to a plurality of vehicles 105, so long as each of the plurality of vehicles 105 belong to a same class of vehicles 105, although implementations are also possible in which each fiducial marker 106 uniquely identifies a specific vehicle 105. Further, two or more markers 106 could be associated with a vehicle 105 or class of vehicles 105, each of the two or more markers 106 specifying a different position on a surface of the vehicle 105. Thus, in one example, respective markers 106 could be provided on a wheel, an exterior body panel, and a rear fascia to allow the stationary sensor 140 to detect displacement of multiple markers 106, i.e., points on the vehicle 105, while the vehicle 105 traverses the displacement object 300 of the ground surface.

A stationary sensor 140 can provide data to determine the displacement of a fiducial marker 106 on a vehicle 105. For example, the stationary sensor 140 can provide data of the vehicle 105 traversing the displacement object 300. When the vehicle 105 passes into the field of view of a stationary sensor 140, an image (or a video image) of the vehicle 105 including the fiducial marker 106 can be acquired, and the computer 150 can identify the marker 106. For example, the computer 150 can identify the marker 106 based on the visual pattern, e.g., using pattern recognition techniques. For example, once a marker 106 is identified in a frame of stationary sensor 140 data, e.g., according to programming in a computer 150 implementing a pattern recognition technique, the computer 150 can retrieve a marker 106 data record from the data store 155. In such an example, the marker 106 may be a QR code (as shown in FIG. 2A), an ArUco mark (as shown in FIG. 2B), a barcode, etc. As another example, the computer 150 may identify the marker 106 within a predetermined radius by, e.g., Bluetooth®, wireless local area networks (WLAN), radio-frequency identification (RFID), etc. In such an example, the fiducial marker 106 may be an RFID tag that provides an identifier, e.g., via the network 135, to locate a record in the data store 155.

As another example, the computer 150 can identify the marker 106 based on comparing marker indicia of the marker 106 in the image to marker indicia of stored marker images. In such an example, the computer 150 can retrieve the stored marker images, e.g., from the data store 155, upon detecting a marker 106 in the image from the stationary sensor 140. Marker indicia are identifiable shapes or markings in a marker 106, e.g., an individual square mark or specified area in a marker 106, that can be identified by the computer 150 in an image of the marker 106. That is, the computer 150 can identify pixels in the marker 106 image representing the specific indicia, e.g., by recognizing a shape or combination of shapes in the marker 106 image.

Upon detecting the marker 106 in the image data, the computer 150 determines the speed of the vehicle 105 while the vehicle 105 traverses the displacement object 300. As one example, the computer 150 can be programmed to transmit a message to the vehicle computer 110 instructing the vehicle computer 110 to operate the vehicle 105 at a specified speed over the displacement object 300 (e.g., when the displacement object 300 is on a test track). The specified speed may be stored in a memory of the computer 150. The specified speed may be determined based on, e.g., empirical testing and/or simulation to determine a speed of the vehicle 105 that produces a desired target displacement T of the marker 106 (e.g., as specified by a manufacturer or designer of the vehicle 105). The vehicle computer 110 may be programmed to actuate one or more vehicle components 125, e.g., a propulsion component 125, a brake component 125, etc., to operate the vehicle 105 at the specified speed based on receiving the message from the computer 150. As another example, the computer 150 can determine the speed of the vehicle 105 based on image data, as described further below (e.g., when the displacement object 300 is on a road). Alternatively, the vehicle computer 110 can transmit a message to the computer 150 indicating the speed of the vehicle 105 while the vehicle 105 traverses the displacement object 300. In such an example, the computer 150 can determine the target displacement T of the marker 106 based on the speed of the vehicle 105 and/or other operating parameters, as discussed further below.

After decoding an identifier from a marker 106, as described above, the computer 150 then analyzes the data received from the stationary sensor 140, e.g., using conventional image analysis techniques, to determine the displacement of the marker 106. For example, the computer 150 can record the displacement of the marker 106 in each frame of image data captured by the stationary sensor 140 while the vehicle 105 traverses the displacement object 300. The computer 150 can then determine the detected displacement D in each frame of image data with reference to the immediately previous frame of image data. The computer 150 can, for example, determine the detected displacement D of the marker 106 based on, e.g., a Cartesian XY coordinate system having an origin on the ground surface. For example, the computer 150 can determine a vertical component $D_y$ of the detected displacement D of the marker 106 relative to the ground surface (as shown in FIG. 4). As another example, the computer 150 can determine a horizontal component $D_x$ of the detected displacement D of the marker 106, e.g., based on a change in a horizontal displacement between the marker 106 and a reference point on the vehicle 105, e.g., a wheel center, while the vehicle 105 traverses the displacement object 300. The computer 150 may then, for example, generate a plot of the detected displacement D of the marker 106 for a duration of time (e.g., while the vehicle 105 traverses the displacement object 300 of the ground surface). The computer 150 can, using various conventional processing techniques, determine one or more detected damping characteristics, e.g., an amplitude, a frequency, a damping ratio, etc., of the suspension component 125 based on the plot of the detected displacement D. Oscillations of the detected displacement D while the vehicle 105 traverses the displacement object indicate the detected damping characteristics of the suspension component 125. That is, the computer 150 determines the detected damping characteristics of the suspension component 125 based on the detected displacement D of the marker 106.

The computer 150 can determine the target displacement T based on at least one operating parameter while the vehicle 105 traverses the displacement object 300. That is, the computer 150 can select one target displacement T from the list of target displacements T stored in the data record based on at least one operating parameter of the detected displacement D matching the corresponding operating parameter of the respective target displacement T. The at least one operating parameter matches the corresponding parameter of the respective target displacement T when the at least one operating parameter is within a predetermined range, e.g., +\-10%, of the corresponding parameter of the respective target displacement T. The one or more operating parameters include at least one of a speed of the vehicle 105, a marker 106 identifier, a vertical displacement V of the displacement object 300 relative to the ground surface, and suspension operating parameters (e.g., a ride height and/or a stiffness) associated with the selected suspension operation mode. The computer 150 may receive one or more operating parameters from the vehicle computer 110, e.g., via the network 135. For example, the vehicle computer 110 can transmit a message to the computer 150 specifying at least one of the suspension operation mode, the speed of the vehicle 105, a weight distribution of the vehicle 105, etc. Additionally, or alternatively, one or more operating parameters, e.g., the speed of the vehicle 105, the vertical displacement V of the displacement object 300, the horizontal displacement of the displacement object 300, etc., may be stored in a memory of the computer 150, e.g., via a user input specifying the operating parameter.

Additionally, or alternatively, the computer 150 can determine one or more operating parameters based on analyzing the image data from the stationary sensor 140. As one example, the computer 150 can determine the speed of the vehicle 105 based on an amount of time, i.e., a number of frames, for the vehicle 105 to travel a predetermined distance, e.g., from one predetermined point to another on the ground surface. As another example, the computer 150 can determine the vertical displacement V and/or the horizontal displacement L (i.e., distance along the ground surface in the direction of travel of the vehicle 105) of the displacement object 300 based on pixels in the image used to depict the displacement object 300.

The computer 150 can then, using known processing techniques, compare the detected displacement D of the marker 106 to the target displacement T of the marker 106 to determine the health status of the suspension component 125. That is, the computer 150 can compare the vertical components $D_y$, $T_y$ (e.g., as shown in FIG. 4) and/or the horizontal components $D_x$, $T_x$ of the detected displacement D and the target displacement T. For example, the computer 150 can analyze the detected displacement D of the marker 106 to determine whether at least one detected damping characteristic, e.g., an amplitude, a frequency, a damping ratio, etc., of the detected displacement D is less than a first threshold T1 of a corresponding target damping characteristic of the target displacement T. That is, the computer 150 can determine whether at least one detected damping characteristic is between the corresponding target damping characteristic and the first threshold T1. The first threshold T1 specifies a maximum value of the damping characteristic above which the suspension component 125 can be deemed unhealthy. For example, as shown in FIG. 4, the first threshold T1 specifies a maximum amplitude above which the suspension component 125 can be deemed unhealthy. The computer 150 may store, e.g., in a memory, a first threshold T1 for each damping characteristic. The first threshold T1 can be determined by, e.g., empirical testing and/or simulation to satisfy suspension performance requirements (e.g., as specified by a manufacturer or designer of the vehicle 105) based on one or more factors, e.g., damping loss, operator comfort, controllability, etc. In the case that the detected damping characteristic of the detected displacement D of the marker 106 is less than the first threshold T1, as shown in FIG. 4, the computer 150 determines that the suspension component 125 is healthy. In the case that the detected damping characteristic of the detected displacement D of the marker 106 is outside the first threshold T1, the computer 150 determines the suspension component 125 is unhealthy. As another example, the computer 150 can analyze the detected displacement D of the marker 106 to determine whether at least one detected damping characteristic is less than the corresponding target damping characteristic. In the case that the detected damping characteristic, e.g., an amplitude, is less than the corresponding target damping characteristic, the computer 150 can determine the suspension component 125 is unhealthy.

Upon determining the suspension component 125 is healthy, the computer 150 can then analyze the detected displacement D of the marker 106 to determine whether the detected damping characteristic of the detected displacement D is less than a second threshold T2 of the corresponding target damping characteristic of the target displacement T. The second threshold T2 specifies a maximum value of the damping characteristic above which the computer 150 can predict the suspension component 125 will become unhealthy. For example, as shown in FIG. 4, the second threshold T2 specifies a maximum amplitude above which the computer 150 can predict the suspension component 125 will become unhealthy. The computer 150 may store, e.g., in a memory, a second threshold T2 for each damping characteristic. The second threshold T2 can, for example, be specified by a manufacturer or designer of the vehicle 105. As another example, the second threshold T2 can be determined by, e.g., empirical testing and/or simulation to preemptively identify maintenance and/or repair needs of suspension components 125 based on one or more factors, e.g., damping loss, operator comfort, controllability, etc. The second threshold T2 is less than the first threshold T1, as shown in FIG. 4. In the case that the detected damping characteristic of the detected displacement D of the marker 106 is less than the second threshold T2, the computer 150 determines that the suspension component 125 is healthy. In the case that the detected damping characteristic of the detected displacement D of the marker 106 is outside the second threshold T2 (i.e., between the first threshold T1 and the second threshold T2), as shown in FIG. 4, the computer 150 can predict the suspension component 125 will become unhealthy. In these circumstances, the computer 150 can request to operate the vehicle 105. For example, the computer 150 can transmit a message to the vehicle computer 110 requesting authorization to operate the vehicle 105.

The computer 150 can operate the vehicle 105 to a predetermined location, e.g., stored in the memory of the computer 150, based on determining the suspension component 125 is unhealthy or receiving authorization from the vehicle computer 110 (e.g., a response indicating a user provided a user input authorizing the request to operate the vehicle 105). That is, the computer 150 can transmit location data of the predetermined location and instructions to the vehicle computer 110 instructing the vehicle computer 110 to operate the vehicle 105 to the predetermined location. Location data may be in a known form, e.g., geo-coordinates such as latitude and longitude coordinates obtained via a navigation system, as is known, that uses the Global Positioning System (GPS). The vehicle computer 110 can then actuate one or more vehicle components 125 to operate the vehicle 105 to the predetermined location based on the instructions and location data. The predetermined location may be specified by a user, e.g., via a human-machine interface, of the computer 150. The predetermined location may, for example, be a location at which the vehicle 105 can obtain repair and/or maintenance services.

The computer 150 can update the target displacement T by inputting the target displacement T and the detected displacement D into a machine learning program, e.g., a convolutional neural network (CNN). A CNN is a software program that can be implemented on a computing device that can be trained to input the target displacement T and the detected displacement D of the marker 106 and output an updated target displacement T of the marker 106. A CNN includes a series of layers, with each layer using the previous layer as input. Each layer contains a plurality of neurons that each receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential target displacement T and the final output is the target displacement T with the highest score. The computer 150 can then store the updated target displacement T in the data store 155.

Additionally, or alternatively, the computer 150 can determine the health status of the suspension component 125 based on a detected height H of the marker 106. For example, the computer 150 can analyze the data received from the stationary sensor 140, e.g., using known processing techniques, to determine the detected height H of the marker 106 prior to the vehicle 105 traversing the displacement object 300, as shown in FIG. 3A. The computer 150 can then compare the detected height H of the marker 106 to the target height of the marker 106, e.g., stored in the marker 106 data record. In the case that the detected height H of the marker 106 matches the target height of the marker 106, the computer 150 can determine the suspension component 125 is healthy. The detected height H of the marker 106 matches the target height of the marker 106 when the detected height H of the marker 106 is within a predetermined range, e.g., +\−10%, of the target height of the marker 106. In the case that the detected height H of the marker 106 does not match the target height of the marker 106, the computer 150 can determine the suspension component 125 is unhealthy. In the case that the computer 150 determines the suspension component is unhealthy, the computer 150 can then operate the vehicle 105 to the predetermined location, as described above.

Figure 5:
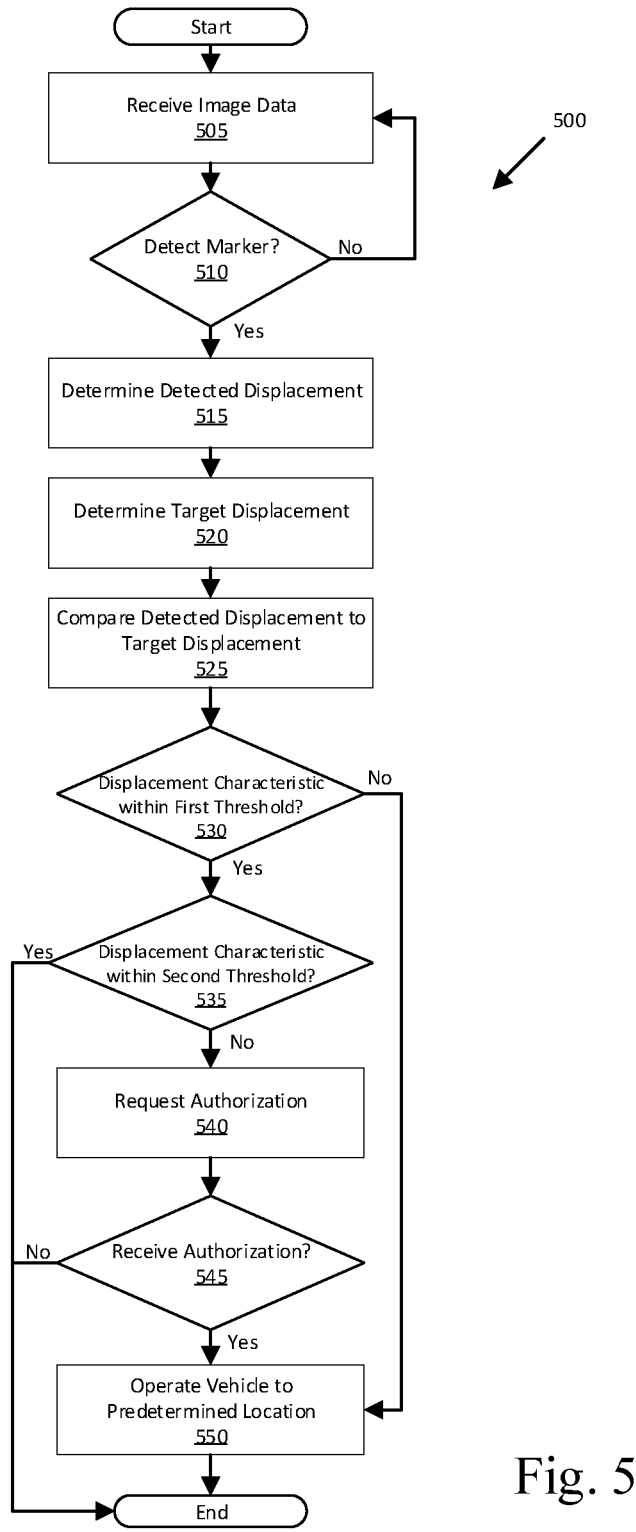
FIG. 5 is a flowchart of an exemplary process for determining the health status of the suspension component.

FIG. 5 is a diagram of an example process 500 for determining the health status of a suspension component 125 of a vehicle 105. The process 500 begins in a block 505.

In the block 505, the computer 150 receives image data from the stationary sensor 140, e.g., via the network 135.

The image data can include a vehicle 105 and a displacement object 300 of a ground surface. The process continues in a block 510.

In the block 510, the computer 150 determines whether a vehicle 105 marker 106 is detected in the image data. For example, the computer 150 analyzes the image data, e.g., according to conventional image analysis techniques. As discussed above, the computer 150 can detect one or more markers 106 in the image data. In the case that the computer 150 detects a marker 106, the process 500 continues in a block 515. Otherwise, the process 500 returns to the block 505.

In the block 515, the computer 150 determines the detected displacement D of the marker 106 while the vehicle 105 traverses the displacement object 300. For example, the computer 150 can be programmed to decode a marker 106 identifier from the marker 106, and to retrieve, e.g., from a data store 155, a record including data about the marker 106 as described above. The computer 150 can then analyze the image data to determine the detected displacement D of the marker 106, e.g., based on pixels in the images used to depict the marker 106, while the vehicle 105 traverses the displacement object 300. The computer 150 can then generate a plot of the detected displacement D for a duration of time (e.g., while the vehicle 105 traverses the displacement object 300) and determine one or more damping characteristics of the detected displacement D based on the plot. The process 500 then continues in a block 520.

In the block 520, the computer 150 determines the target displacement T of the marker 106. For example, the computer 150 can determine one or more operating parameters of the vehicle 105, such as a speed of the vehicle 105, a vertical displacement of the displacement object 300, one or more suspension operating parameters associated with a selected suspension operation mode, etc., based on the image data, as described above. Additionally, or alternatively, the computer 150 can receive data from the vehicle computer 110 specifying one or more operating parameters. The computer 150 can then determine the target displacement T based on the one or more operating parameters of the vehicle 105 matching the corresponding operating parameters of the target displacement T, e.g., stored in the data store 155, as described above. As another example, the computer 150 can retrieve data, e.g., from the data store 155, describing the target displacement T and/or included in the marker 106 record retrieved in the block 520. The computer 150 can determine one or more damping characteristics of the target displacement T based on a plot of the target displacement T for a duration of time (e.g., while the vehicle 105 traverses the displacement object 300), e.g., stored in a memory. The process 500 continues in a block 525.

In the block 525, the computer 150 compares the detected displacement D of the marker 106 to the target displacement T of the marker 106. For example, the computer 150 can compare the vertical components $D_y$, $T_y$ (e.g., as shown in FIG. 4) and/or the horizontal components $D_x$, $T_x$ of the detected displacement D and the target displacement T. The process 500 continues in a block 530.

In the block 530, the computer 150 determines whether at least one detected damping characteristic is less than a first threshold T1 of a corresponding target damping characteristic. In the case that the detected damping characteristic is less than the first threshold T1, the computer 150 determines the suspension component 125 is healthy. In the case that the detected damping characteristic is outside the first threshold T1, the computer 150 determines the suspension component 125 is unhealthy. Additionally, or alternatively, the computer 150 can determine whether the detected damping characteristic is less than the corresponding target damping characteristic. In the case that the detected damping characteristic is less than the corresponding target damping characteristic, the computer 150 can determine the suspension component 125 is unhealthy. When the suspension component 125 is healthy, the process 500 continues in a block 535. Otherwise, the process 500 continues in a block 550.

In the block 535, the computer 150 determines whether the detected damping characteristic is less than a second threshold T2 of the corresponding target damping characteristic. As described above, the second threshold T2 is less than the first threshold T1. In the case that the detected damping characteristic is less than the second threshold T2, the computer 150 determines the suspension component 125 is healthy. In the case that the detected damping characteristic is equal to or greater than the second threshold T2, the computer 150 predicts the suspension component 125 will become unhealthy. When the computer 150 predicts the suspension component 125 will become unhealthy, the process 500 continues in a block 540. Otherwise, the process 500 ends.

In the block 540, the computer 150 requests authorization from the vehicle computer 110 to operate the vehicle 105. For example, the computer 150 can transmit the request via the network 135. The process 500 continues in a block 545.

In the block 545, the computer 150 determines whether authorization is received from the vehicle computer 110, e.g., within a time period (e.g., 10 seconds) stored in a memory of the computer 150. The computer 150 can, for example, start a timer upon transmitting the request for authorization. For example, the computer 150 can receive a response from the vehicle computer 110 authorizing the computer 150 to operate the vehicle 105. The response can indicate a user provided a user input, e.g., via an HMI, authorizing the computer 150 to operate the vehicle 105. In the case that the computer 150 receives authorization prior to expiration of the timer, i.e., within the time period, the process 500 continues in a block 550. Otherwise, the process 500 ends.

In the block 550, the computer 150 operates the vehicle 105 to a predetermined location. For example, the computer 150 transmits location data of the predetermined location and instructions to the vehicle computer 110, e.g., via the network 135. The vehicle computer 110 then actuates one or more vehicle components 125 to operate the vehicle 105 based on the instructions and location data. The process 500 ends following the block 550.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   determine a detected displacement of a marker on a vehicle based on image data captured while the vehicle traverses a vertical displacement of a ground surface;
   then determine a health status of a suspension component of the vehicle is unhealthy based on comparing the detected displacement of the marker to a target displacement of the marker, wherein the target displacement specifies displacement of the marker indicating the suspension component is healthy;
   operate the vehicle based on the suspension component being unhealthy; and
   update the target displacement based on the detected displacement of the marker and the target displacement being input into a neural network, wherein the neural network then outputs an updated target displacement.

2. The system of claim 1, wherein the instructions further include instructions to determine the suspension component is unhealthy based on a detected damping characteristic of the suspension component being equal to or greater than a first threshold from a corresponding target damping characteristic of the suspension component, wherein the detected and target damping characteristics are one of an amplitude, a frequency, or a damping ratio.

3. The system of claim 2, wherein the instructions further include instructions to request authorization to operate the vehicle based on the detected damping characteristic of the suspension component being between a second threshold from the corresponding damping characteristic of the suspension component and the first threshold, wherein the second threshold is less than the first threshold.

4. The system of claim 1, wherein the instructions further include instructions to, upon receiving authorization from a vehicle computer, transmit a message to the vehicle computer actuating one or more vehicle components to operate the vehicle to a predetermined location.

5. The system of claim 1, wherein the instructions further include instructions to determine the target displacement based on at least one of a speed of the vehicle, a marker identifier, the vertical displacement, and a suspension operation mode, wherein the suspension operation mode specifies operating parameters of one or more suspension components of the vehicle.

6. The system of claim 4, wherein the instructions further include instructions to determine the speed of the vehicle based on the image data.

7. The system of claim 4, wherein the instructions further include instructions to detect the marker identifier in the image data.

8. The system of claim 4, wherein the instructions further include instructions to receive a message from a vehicle computer specifying a suspension operation mode to operate the vehicle to the predetermined location.

9. The system of claim 4, wherein the instructions further include instructions to determine the vertical displacement based on the image data.

10. The system of claim 1, wherein the instructions further include instructions to transmit a message to a vehicle computer actuating one or more vehicle components to operate the vehicle at a specified speed over the vertical displacement.

11. The system of claim 1, wherein the instructions further include instructions to, upon determining the suspension component is unhealthy, transmit a message to a vehicle computer actuating one or more vehicle components to operate the vehicle to a predetermined location.

12. The system of claim 1, wherein the instructions further include instructions to identify the marker based on comparing marker indicia in the image to marker indicia in stored marker images.

13. The system of claim 1, wherein the suspension component is one of a damper, a spring, or a bushing.

14. A method comprising:
    determining a detected displacement of a marker on a vehicle based on image data captured while the vehicle traverses a vertical displacement of a ground surface;
    then determining a health status of a suspension component of the vehicle is unhealthy based on comparing the detected displacement of the marker to a target displacement of the marker, wherein the target displacement specifies displacement of the marker indicating the suspension component is healthy;
    operating the vehicle based on the suspension component being unhealthy; and
    updating the target displacement based on the detected displacement of the marker and the target displacement being input into a neural network, wherein the neural network then outputs an updated target displacement.

15. The system of claim 1, wherein the instructions further include instructions to:
- determine a detected height of the marker based on the image data; and
- then determine the health status of a suspension component of the vehicle is unhealthy based further on comparing the detected height of the marker to a target height of the marker, wherein the target height specifies a height of the marker indicating the suspension component is healthy.

16. The method of claim 14, further comprising:
- upon receiving authorization from a vehicle computer, transmitting a message to the vehicle computer actuating one or more vehicle components to operate the vehicle to a predetermined location; and
- receiving a message from a vehicle computer specifying a suspension operation mode to operate the vehicle to the predetermined location.

17. The method of claim 14, further comprising determining the suspension component is unhealthy based on a detected damping characteristic of the suspension component being equal to or greater than a first threshold from a corresponding target damping characteristic of the target displacement, wherein the detected and target damping characteristics are one of an amplitude, a frequency, or a damping ratio.

18. The method of claim 17, further comprising requesting authorization to operate the vehicle based on the detected damping characteristic of the suspension component being between a second threshold from the corresponding target damping characteristic of the suspension component and the first threshold, wherein the second threshold is less than the first threshold.

19. The method of claim 14, further comprising determining the target displacement based on at least one of a speed of the vehicle, a marker identifier, the vertical displacement, and a suspension operation mode, wherein the suspension operation mode specifies operating parameters of one or more suspension components of the vehicle.

20. The method of claim 14, wherein the suspension component is one of a damper, a spring, or a bushing.

* * * * *